March 10, 1925. 1,529,243
J. L. DRAKE ET AL
FLATTENING TABLE FOR CONTINUOUS SHEET GLASS
Filed Jan. 30, 1924 2 Sheets-Sheet 1
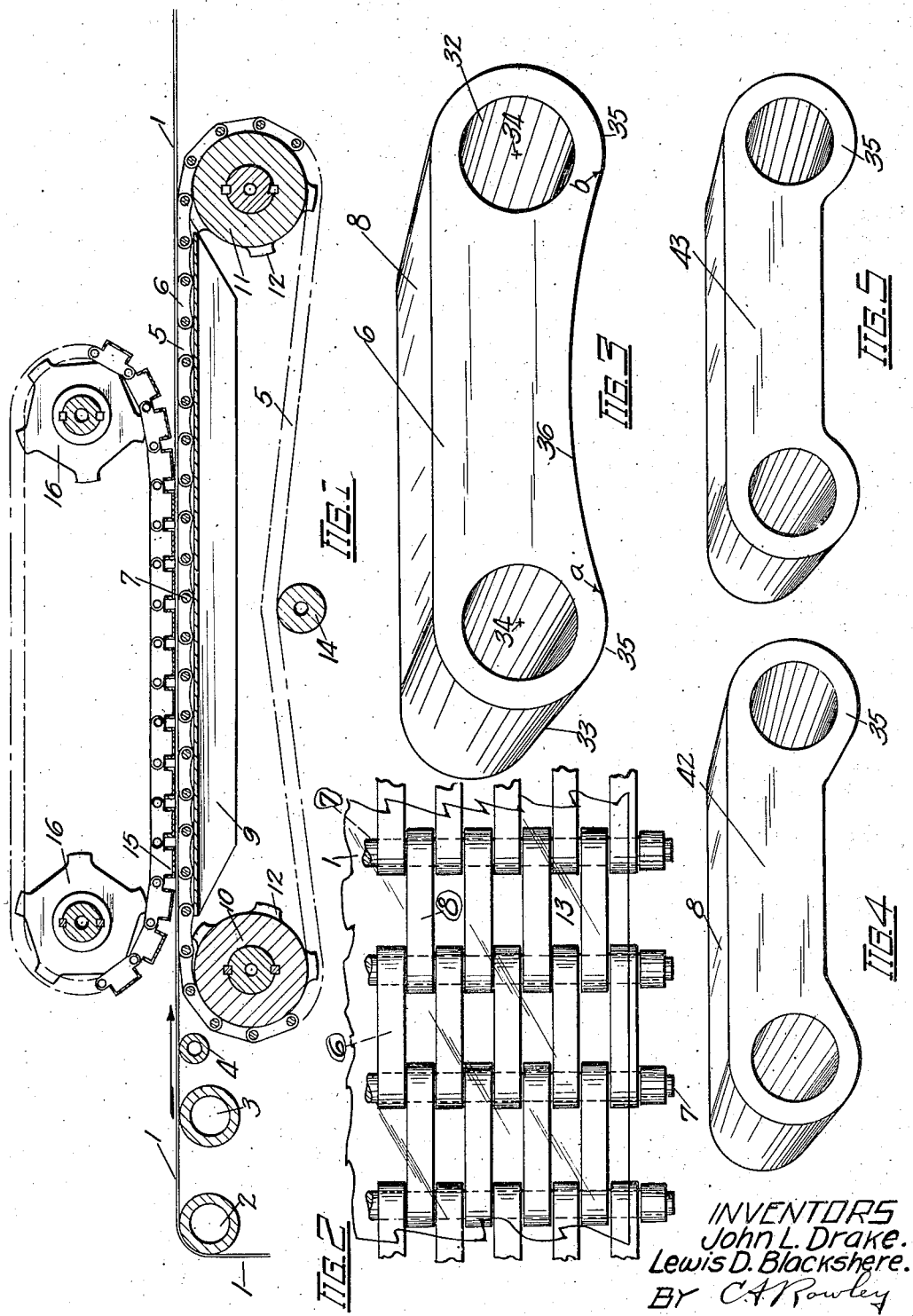
INVENTORS
John L. Drake.
Lewis D. Blackshere.
BY C. A. Rowley
ATTORNEY

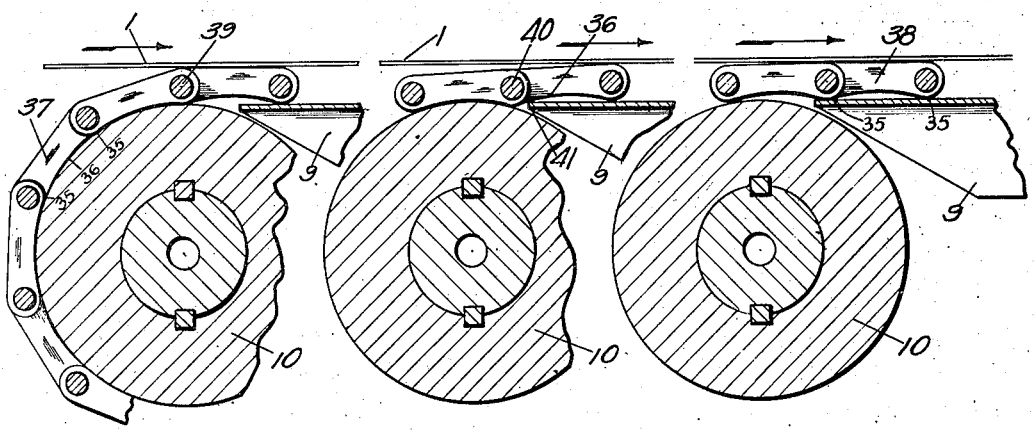
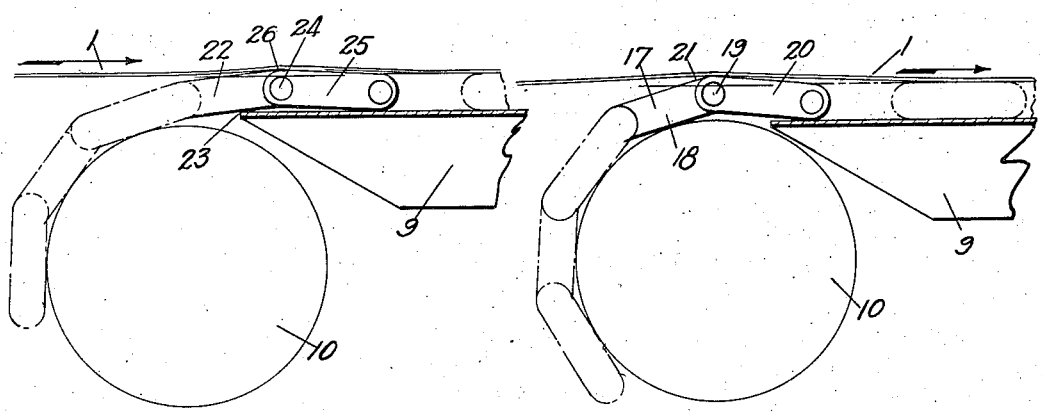
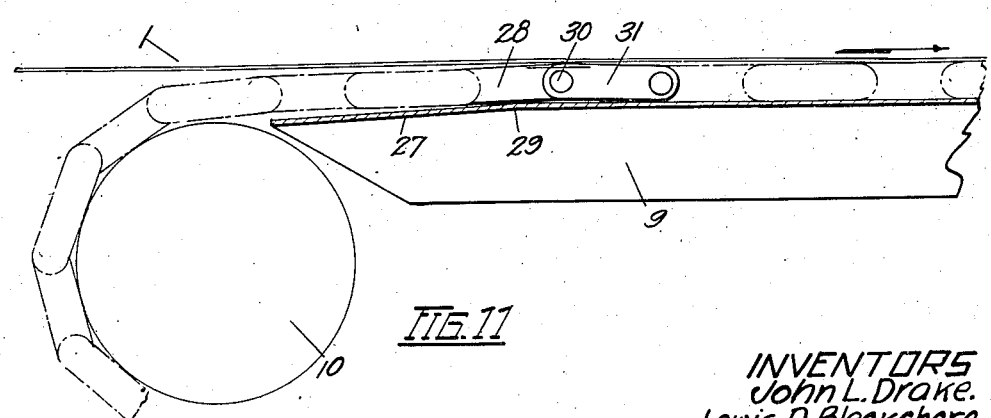

Patented Mar. 10, 1925.

1,529,243

UNITED STATES PATENT OFFICE.

JOHN L. DRAKE AND LEWIS D. BLACKSHERE, OF CHARLESTON, WEST VIRGINIA, ASSIGNORS TO THE LIBBEY-OWENS SHEET GLASS COMPANY, OF TOLEDO, OHIO, A CORPORATION OF OHIO.

FLATTENING TABLE FOR CONTINUOUS SHEET GLASS.

Application filed January 30, 1924. Serial No. 689,406.

*To all whom it may concern:*

Be it known that we, JOHN L. DRAKE and LEWIS D. BLACKSHERE, citizens of the United States, residing at Charleston, in the county of Kanawha and State of West Virginia, have invented new and useful Improvements in Flattening Tables for Continuous Sheet Glass, of which the following is a specification.

This invention relates to improvements in the art of drawing sheet glass, and more particularly to an improved form of drawing and flattening table for the continuous glass sheet.

In certain forms of sheet-glass drawing apparatus, for example that disclosed in the patent to Colburn, 1,248,809, granted December 4, 1917, the sheet of glass, after being drawn vertically from the molten source and bent into the horizontal plane about a rotating bending roll, passes onto the flat upper surface of a horizontally traveling table or conveyor. This flattening-table comprises an endless flexible belt, consisting of a series of pivotally connected metallic links, the belt passing about a pair of supporting drums at the two ends of the loop, and the upper sheet-carrying run of the belt being slidably supported on the flat upper surface of a stationary table mounted between the two drums. The plastic glass sheet is carried by the flat upper surface of this linked belt and settles thereupon, becoming absolutely flat while being carried along with the conveyor belt. The friction of the sheet resting upon the traveling table serves to provide the tractive pull for drawing the glass sheet from its molten source. This frictional engagement with the table may be increased if necessary by providing a second endless drawing member which rests its weight upon the upper surface of the glass sheet while the sheet is upon the linked conveyor belt.

It is obviously essential that the upper sheet-supporting surface of the upper run of the linked belt be absolutely flat and horizontal at all times, when in contact with the glass, or that any deviation from this flat horizontal condition be downwardly from the sheet so that at no time does any portion of any link extend above the level of the horizontal run of the sheet of glass, else the deviations from this plane will be transferred to and cause impressions in the plastic glass sheet which rests thereupon. With the form of belt heretofore in use, impressions or defects in the glass sheet have sometimes been caused by the failure of the links in the belt to pass from the curved end portions of their orbit into the upper flat horizontal portion, or from this upper run into the other curved end portion of their orbit without buckling-up or projecting into the horizontal plane occupied by the plastic glass sheet. The reasons for this lifting of the ends of the links at the ends of the run of the belt will be explained in detail hereinafter.

The object of the present invention is to provide an improved form of link for use in the flattening and conveying belt above described, in combination with an improved arrangement of the supporting drums and stationary supporting table, so that the causes for buckling or lifting of the links at the two ends of their upper horizontal run will be entirely eliminated.

Other objects and advantages of this invention will be more apparent from the following detailed description of certain approved forms of the apparatus.

In the accompanying drawings:

Fig. 1 is a longitudinal vertical section through that portion of the sheet-drawing mechanism which includes the flattening table hereinafter described.

Fig. 2 is a plan view of a portion of the flattening and conveying belt, illustrating the arrangement of the intermeshing pivoted links.

Fig. 3 is a perspective of one of the improved links.

Figs. 4 and 5 show alternative forms of links, embodying the principles of this invention.

Figs. 6, 7 and 8 are detailed views illustrating the operation of these links while passing from one of the drums onto the stationary supporting table.

Figs. 9, 10 and 11 are diagrams illustrating the action of the form of links heretofore in use, and the defects that are avoided by the present invention.

Referring first to Figs. 1 and 2, the glass sheet 1 is drawn upwardly from its molten source, and while still plastic is bent about the bending roll 2 into the horizontal plane.

The sheet is then reheated to increase its plasticity and after passing over certain intermediate supporting rollers, such as 3 and 4, it passes onto the drawing and flattening table forming the subject-matter of this invention. This table comprises an endless flexible sheet-supporting conveyor belt 5 formed of a series of pivotally connected intermeshing links 6. These links are all of the same form, and as shown in Fig. 2, the links are arranged in an overlapping and intermeshing relation with their ends pivoted on continuous cross-shafts or pivot pins 7, which extend completely across the width of the belt. The sheet of glass rests upon the upper flat horizontal surfaces 8 of the links. During the upper horizontal sheet-carrying run of this belt, it travels along and slides upon the flat horizontal surface of a stationary supporting table 9 positioned within the belt loop. At the ends of the loop the linked belt travels around a pair of supporting drums 10 and 11, rotatably supported adjacent the ends of table 9. Sprocket wheels arranged at suitable intervals in the respective drums 10 and 11 have their teeth 12 projecting into the spaces 13 between certain of the links. The drum 11 and corresponding sprocket wheels are driven to draw the linked conveyor belt across the table 9 and around the belt-carrying drums 10 and 11. The lower idle run of the belt may be supported by a cylindrical drum 14 to prevent excessive sagging of the lower portion of the belt.

Above this supporting and flattening table an endless chain of cross-bars 15 mounted on sprockets 16 is driven at a speed corresponding to that of the sheet and conveyor 5 so that the weight of the bars 15 will rest upon the upper surfaces of the sheet and hold the sheet securely in engagement with the supporting conveyor table. Usually the cross-bars 15 are elevated at their central portions, so that they only rest on the glass sheet adjacent the edges to avoid the possibility of marring the upper sheet surface. Sometimes the use of this upper chain of weighted bars is unnecessary as the traction of the glass sheet upon the conveyor table 5 is sufficient to draw the sheet from its molten source. Also rollers resting upon the upper surface of portions of the sheet are sometimes used to provide the necessary traction.

In the conveyor belts 5 previously in use, the links have had a flat straight lower surface, similar to the upper sheet-carrying surface 8, this flat surface sliding upon the supporting table 9 and resting during the curved end portions of the belt's orbit upon the cylindrical surfaces of the drums 10 and 11. The action of this construction of link is shown diagrammatically in Figs. 9, 10 and 11. Referring first to Fig. 9, this diagram illustrates the action of this form of link with the flat lower supporting surface, when the stationary supporting table 9 is positioned with its upper link supporting surface tangent to the cylindrical surface of drum 10. It will be noted that each of the links, such as 17, while passing about the drum 10, will contact with the supporting drum 10 only at a central point, such as 18, on its lower surface. The ends of the links, such as its pivotal connection 19 with adjacent link 20, will be elevated away from the supporting surface of the drum. As the links pass around the upper portion of the drum into the horizontal plane this lifted end of the link will be projected up above the normal plane of the lower surface of the glass sheet, thus causing the sheet to be lifted or bulged upwardly at this point as shown at 21 in Fig. 9.

In an attempt to avoid this defect, the table 9 has been elevated somewhat above the upper surface of the supporting drum 10, as shown in Fig. 10. In this case, as the link, such as 22, rides over the edge 23 of the supporting table 9, the pivotal connection 24 between the adjacent ends of links 22 and 25 will be lifted upwardly as shown at 26, bulging the sheet up above its normal horizontal plane.

It has also been attempted, as illustrated in Fig. 11, to tilt the end of table 9 downwardly as at 27, to provide a more gradual change in direction in the travel of the links from the surface of drum 10 to the surface of table 9. However, with this construction, although the lifting error is decreased, it will be noted that as link 28 rides over the point 29 where the sloped portion 27 joins with the horizontal portion of the table 9, the pivoted ends 30 of adjoining links 28 and 31 will be lifted to some extent above the horizontal plane in which the lower portion of the glass sheet should remain.

The improved form of link forming a portion of the subject-matter of this invention was designed to avoid the defects noted above. Referring to Figs. 3, 6, 7 and 8, it will be noted that this new link has an upper flat sheet-supporting surface 8 similar to the type of links formerly in use. At each end the link is provided with a pivot hole 32 adapted to be journaled upon one of the pivot pins 7. The end portions of the lower surface of the link around to the points $a$ and $b$ (Fig. 3) are formed as continuations of the arcuate surfaces 33 at the ends of the links. These arcuate surfaces are centered at the pivotal axes 34 of pivot holes 32. These lower arcuate supporting surfaces 35 are the portions of the link which slide upon the upper horizontal supporting surface of table 9 as the belt moves across this table. The remainder of the lower surface of link 6 between the points $a$ and $b$ is formed with a reversed arcuate curvature 36 corresponding to the curvature of the cylindrical link-supporting surface of one of the drums 10 or 11.

Referring now to Figs. 6, 7 and 8, it will be noted that the upper surface of supporting table 9 is positioned tangential to the cylindrical surface of drum 10. When one of the links, such as 37, Fig. 6, rests upon the cylindrical surface of drum 10, it will be noted that both the end arcuate supporting surfaces 35 and the central supporting surface 36, rest in contact with the cylindrical surface of the drum. The distance from each of the pivot centers 34 to the cylindrical supporting surface of the drum will be just equal to the radius of curvature of arcuate supporting surfaces 35. Now when one of these links, such as 38 (Fig. 8), rests upon the supporting table 9, the two arcuate supporting surfaces 35 will be simultaneously in contact with the table top and the distance from the pivot centers 34 to the supporting table top will be, as before, just equal to the radius of curvature of arcuate surfaces 35. It will be seen that there will be no tendency for one of the pivot centers to move away from the cylindrical surface of the drum 10 a distance greater than this radius of curvature until the links have passed onto the supporting table 9. As shown in Fig. 6, the pivoted ends 39 of two adjacent links are exactly above the axes of the drum 10, but there is no tendency for this pivoted connection to lift up above the drum as shown in Fig. 9, and no portion of either of the adjacent links will project above the normal horizontal plane occupied by the lower surface of glass sheet 1. As the links pass on around drum 10 onto table 9, as shown in Fig. 7, they may either pass directly onto this table or if the chain were sufficiently slack the pivotal connection 40 might rest upon the drum surface after this end of the link has passed beyond the vertical center of drum 10. In this case the link will not contact immediately with the lower surface of sheet 1, but will be pushed up into engagement with the sheet as the lower arcuate surface 36 of the link rides over the end 41 of the supporting table. This end 41 of the table acting against the lower curved supporting surface 36 will push the link up into the position shown at 38 in Fig. 8, but at no time will any portion of this link or the next adjacent link project above the plane of the lower surface of glass sheet 1.

The same series of movements will take place in a reversed order at the opposite end of the belt loop, where the links pass from table 9 onto the cylindrical surface of drum 11.

While the form of link shown in Fig. 3 is the preferred one, links 42 or 43, such as shown in Figs. 4 and 5, might be used, the essential features of this link being that the lower central portion of the link be cut away sufficiently to allow the lower arcuate end surfaces of the link to rest simultaneously upon either the supporting surface of one of the cylindrical drums, or upon the supporting surface of table 9.

Claims:

1. A drawing and flattening table for sheet-glass, comprising in combination a pair of rotary cylindrical drums, a stationary table positioned between the drums and having a flat upper supporting surface, and a flexible link belt adapted to travel around the drums and over the table, the belt consisting of a plurality of pivotally connected links, each link having a flat upper sheet-supporting surface, and a lower surface of such conformation that the pivot centers of the links will be the same distance from the cylindrical link-supporting surface of the drums, while on the drums, as these centers will be from the flat link-supporting surface of the table, while on the table.

2. A drawing and flattening table for sheet-glass, comprising in combination a pair of rotary cylindrical drums, a stationary table positioned between the drums and having a flat upper supporting surface tangent to the upper arcs of the drums, and a flexible link belt adapted to travel around the drums and over the table, the belt consisting of a plurality of pivotally connected links, each link having a flat upper sheet-supporting surface, and a lower surface of such conformation that the pivot centers of the links will be the same distance from the cylindrical link-supporting surface of the drums, while on the drums, as these centers will be from the flat link-supporting surface of the table, while on the table.

3. A drawing and flattening table for sheet-glass, comprising in combination a pair of rotary cylindrical drums, a stationary table positioned between the drums and having a flat upper supporting surface, and a flexible link belt adapted to travel around the drums and over the table, the belt consisting of a plurality of pivotally connected links, each link having a flat upper sheet-supporting surface, and a lower surface comprising arcuate link-supporting surfaces at each end adapted to slide upon the flat surface of the table, the central portion of the lower surface being cut away to allow both the arcuate portions to rest simultaneously on the cylindrical surface of one of the drums.

4. A drawing and flattening table for sheet-glass, comprising in combination a pair of rotary cylindrical drums, a stationary table positioned between the drums and having a flat upper supporting surface tangent to the upper arcs of the drums, and a flexible link belt adapted to travel around the drums and over the table, the belt consisting of a plurality of pivotally connected links, each link having a flat upper sheet-supporting surface, and a lower surface comprising arcuate link-supporting surfaces at each end adapted to slide upon the flat surface of the table, the central portion of the lower surface being cut away to allow both the arcuate portions to rest simultaneously on the cylindrical surface of one of the drums.

5. A drawing and flattening table for sheet-glass, comprising in combination a pair of rotary cylindrical drums, a stationary table positioned between the drums and having a flat upper supporting surface, and a flexible link belt adapted to travel around the drums and over the table, the belt consisting of a plurality of pivotally connected links, each link having a flat upper sheet-supporting surface, and a lower surface comprising arcuate link-supporting surfaces at each end adapted to slide upon the flat surface of the table, the central portion of the lower surface being cut away to fit the cylindrical surface of one of the drums and also allow portions of the two arcuate surfaces to rest on this cylindrical drum surface.

6. A drawing and flattening table for sheet-glass, comprising in combination a pair of rotary cylindrical drums, a stationary table positioned between the drums and having a flat upper supporting surface, and a flexible link belt adapted to travel around the drums and over the table, the belt consisting of a plurality of pivotally connected links, each link having a flat upper sheet-supporting surface, and a lower surface comprising arcuate link-supporting surfaces at each end adapted to slide upon the flat surface of the table, the arcuate surfaces being centered at the pivotal axes of the link connections, and the central portion of the lower surface being cut away to allow both the arcuate portions to rest simultaneously on the cylindrical surface of one of the drums.

7. A link for a flexible sheet-glass-supporting conveyor table, adapted to travel over both plane and cylindrical supporting surfaces, the link having a flat upper sheet-supporting surface, pivots adjacent each end, and lower link-supporting surfaces adjacent each end so shaped that they may both rest simultaneously on either a plane or a cylindrical supporting surface.

8. A link for a flexible sheet-glass-supporting conveyor table, adapted to travel over both plane and cylindrical supporting surfaces, the link having a flat upper sheet-supporting surface, pivots adjacent each end, and lower arcuate link-supporting surfaces respectively centered at the pivot-centers, the central lower portion of the link being cut away between the two arcuate surfaces, to allow these surfaces to simultaneously rest upon one of the cylindrical surfaces about which the link is adapted to travel.

9. A link for a flexible sheet-glass-supporting conveyor table, adapted to travel over both plane and cylindrical supporting surfaces, the link having a flat upper sheet-supporting surface, pivots adjacent each end, and lower arcuate link-supporting surfaces respectively centered at the pivot-centers, these arcuate surfaces being joined by a reversely curved arcuate surface having the same center of curvature as one of the cylindrical supporting surfaces about which the link is adapted to travel.

Signed at Charleston, in the county of Kanawha, and State of West Virginia, this 24th day of January, 1924.

JOHN L. DRAKE.
LEWIS D. BLACKSHERE.